(12) United States Patent
Son et al.

(10) Patent No.: US 8,169,575 B2
(45) Date of Patent: May 1, 2012

(54) METHOD OF MANUFACTURING LIQUID CRYSTAL DISPLAY

(75) Inventors: Jong-Ho Son, Seoul (KR); Jae-Jin Lyu, Yongin-si (KR); Seung-Beom Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 524 days.

(21) Appl. No.: 12/388,942

(22) Filed: Feb. 19, 2009

(65) Prior Publication Data
US 2009/0213320 A1    Aug. 27, 2009

(30) Foreign Application Priority Data
Feb. 22, 2008   (KR) .................. 10-2008-0016296

(51) Int. Cl.
*G02F 1/1337*    (2006.01)

(52) U.S. Cl. ...................................... 349/124; 349/130

(58) Field of Classification Search .................... 349/129
See application file for complete search history.

(56) References Cited

U.S. PATENT DOCUMENTS

| | | | | |
|---|---|---|---|---|
| 7,262,824 | B2 * | 8/2007 | Sasabayashi et al. | 349/129 |
| 7,724,333 | B2 * | 5/2010 | Sohn et al. | 349/129 |
| 2006/0244881 | A1 * | 11/2006 | Sasaki et al. | 349/87 |

FOREIGN PATENT DOCUMENTS

| | | |
|---|---|---|
| JP | 2004302013 | 10/2004 |
| JP | 2004318077 | 11/2004 |
| KR | 1020010081454 | 8/2001 |

* cited by examiner

*Primary Examiner* — Eric Wong
(74) *Attorney, Agent, or Firm* — H.C. Park & Associates, PLC

(57) ABSTRACT

A method of manufacturing a liquid crystal display includes providing a first display panel, providing a second display panel, disposing liquid crystals and an alignment additive between the first display panel and the second display panel, applying a gradually increasing pre-tilting voltage to the first display panel and the second display panel, and hardening the alignment additive.

16 Claims, 12 Drawing Sheets

METHOD OF MANUFACTURING LIQUID CRYSTAL DISPLAY

CROSS-REFERENCE TO RELATED APPLICATION

This application claims priority from and the benefit of Korean Patent Application No. 10-2008-0016296, filed on Feb. 22, 2008, which is hereby incorporated by reference for all purposes as if fully set forth herein.

BACKGROUND OF THE INVENTION

1. Field of the Invention

The present invention relates to relates to a method of manufacturing a liquid crystal display, and more particularly, to a method of manufacturing a liquid crystal display that may have reduced occurrences of residual images and an improved liquid crystal response time.

2. Discussion of the Background

Liquid crystal displays are one of the most widely used types of flat panel displays and typically include first and second substrates (or upper and lower display panels) with field generating electrodes and a layer of liquid crystal material disposed between the two display panels. The transmittance of light incident on the panels is controlled by applying selected voltages to the field-generating electrodes to generate electric fields, which determine the orientation of the liquid crystals in the liquid crystal layer and thereby adjust the polarization of the light incident upon the display panel.

Specifically, a vertical alignment (VA) mode liquid crystal display, in which liquid crystals are aligned such that the long axes of the liquid crystals are perpendicular to the two display panels (i.e., upper and lower display panels) in the absence of an electric field, has a high contrast ratio and a wide reference viewing angle. In the VA mode liquid crystal display, domain forming units, e.g., a plurality of apertures or protrusions, may be provided on the field generating electrode(s), thereby achieving a wide viewing angle.

Examples of a liquid crystal display include a VA mode liquid crystal display in which domain forming units are provided on both of the upper and lower display panels, and a patternless VA mode liquid crystal display in which micro-patterns are provided on the lower panel only and no patterns are provided on the upper panel. A pixel area is partitioned into multiple domains by the domain forming units and liquid crystals in each domain are tilted in the same direction.

Recently, techniques for pre-tilting liquid crystals at an angle have been developed to improve response time. For example, an alignment additive to pre-tilt the liquid crystals may be added between the first display panel and the second display panel and then hardened.

However, a residual image may be generated depending on the type of hardening process used for the alignment additive.

SUMMARY OF THE INVENTION

The present invention provides a method of manufacturing a liquid crystal display, which may reduce the occurrence of residual images and improve the liquid crystal response time.

Additional features of the invention will be set forth in the description which follows, and in part will be apparent from the description, or may be learned by practice of the invention.

The present invention discloses a method of manufacturing a liquid crystal display including providing a first display panel, providing a second display panel, disposing liquid crystals and an alignment additive between the first display panel and the second display panel, applying a gradually increasing pre-tilting voltage to the first display panel and the second display panel, and hardening the alignment additive.

The present invention also discloses a method of manufacturing a liquid crystal display including providing a first display panel on which a color filter, a black matrix, a pixel electrode, and a first alignment layer are disposed, providing a second display panel on which a common electrode and a second alignment layer are disposed, disposing liquid crystals and a reactive monomer additive between the first display panel and the second display panel, applying a gradually increasing pre-tilting voltage to the first display panel and the second display panel, and irradiating light from above the second display panel towards the second display panel to harden the reactive monomer.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
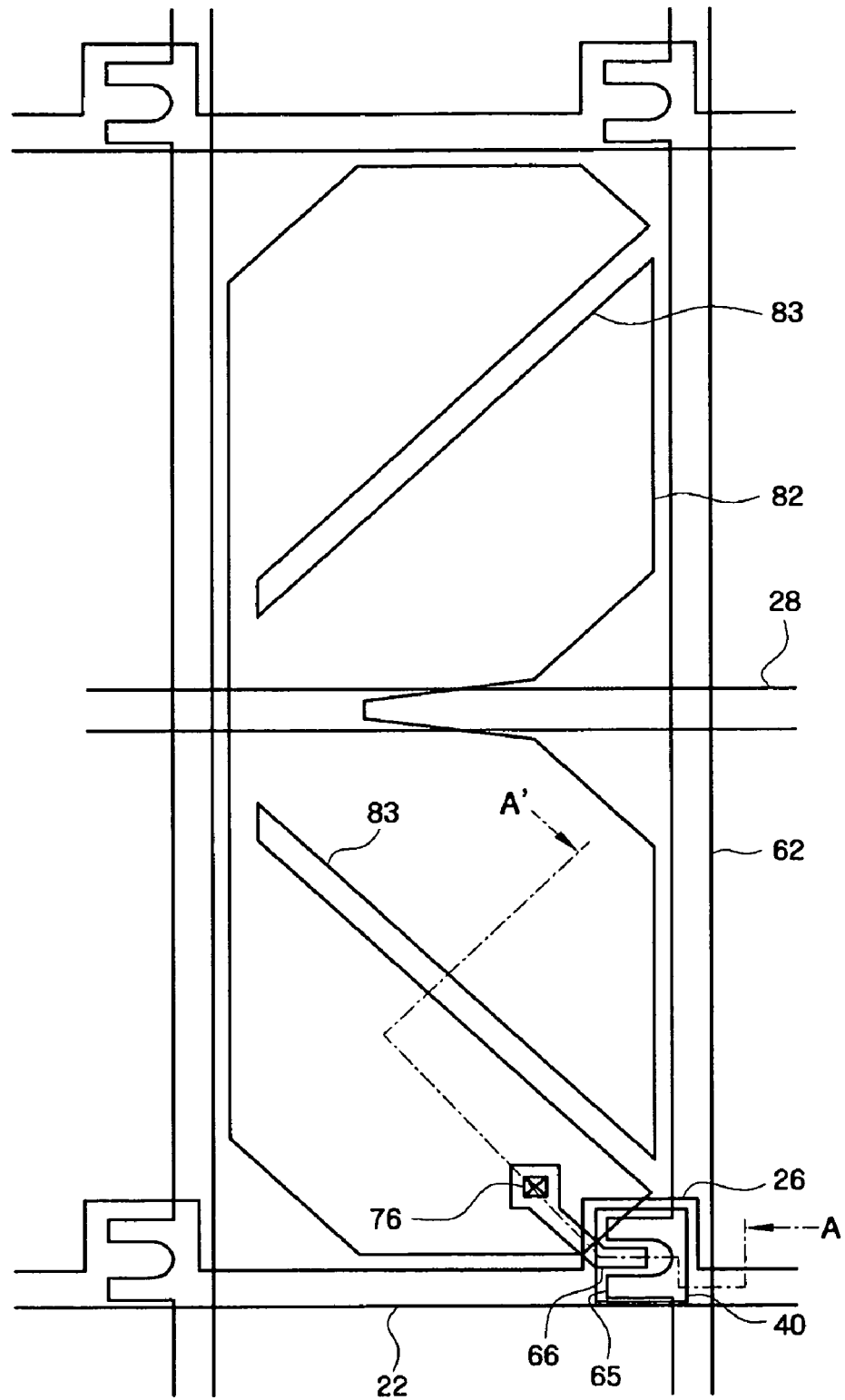
FIG. 1 is a layout diagram of a liquid crystal display manufactured by a method according to an exemplary embodiment of the present invention.

The invention is described more fully hereinafter with reference to the accompanying drawings, in which embodiments of the invention are shown. This invention may, however, be embodied in many different forms and should not be provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on," "connected to," or "coupled to" another element or layer, it can be directly on, connected or coupled to the other element or layer or intervening elements or layers may be present. In contrast, when an element is referred to as being "directly on," "directly connected to," or "directly coupled to" another element or layer, there are no intervening elements or layers present. As used herein, the term "and/or" includes any and all combinations of one or more of the associated listed items.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 2:
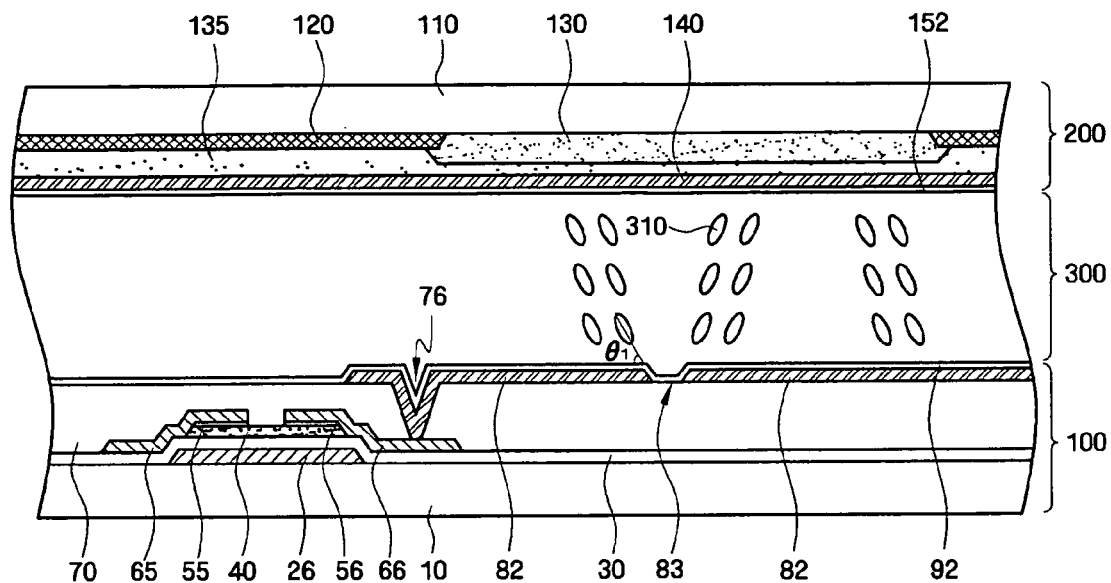
FIG. 2 is a cross-sectional view taken along line A-A' of FIG. 1.
Figure 3:
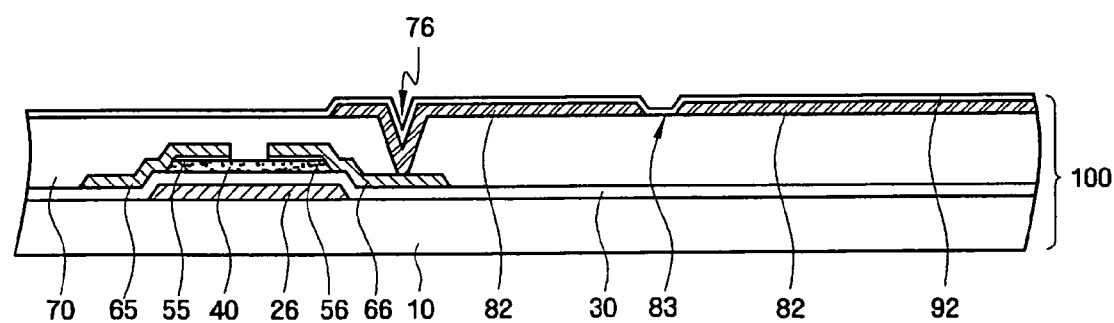
FIG. 3, FIG. 4, FIG. 5, and FIG. 6 are cross-sectional views showing processing steps of a method of manufacturing a liquid crystal display according to an exemplary embodiment of the present invention.

Hereinafter, a method of manufacturing a liquid crystal display according to an exemplary embodiment of the present invention will be described with reference to FIG. 1, FIG. 2, FIG. 3, FIG. 4, FIG. 5, FIG. 6, and FIG. 7. FIG. 1 is a layout diagram of a liquid crystal display manufactured by a method according to an exemplary embodiment of the present invention, and FIG. 2 is a cross-sectional view taken along line A-A' of FIG. 1. FIG. 3, FIG. 4, FIG. 5, and FIG. 6 are cross-sectional views showing processing steps of a method of manufacturing a liquid crystal display according to an exemplary embodiment of the present invention, and FIG. 7 is a graph of a pre-tilting voltage of FIG. 6.

A first display panel 100 where a plurality of elements, such as a pixel electrode 82 having a domain forming unit 83 formed therein, are formed is provided.

More specifically, after a gate metal layer (not shown) is deposited on an insulating substrate 10 by, for example, sputtering, it is patterned to form a gate wiring including a gate line 22, a gate electrode 26, and a storage electrode 28.

A gate insulating layer 30, which may be made of silicon nitride ($SiN_x$), is formed on the gate wiring 22, 26, and 28 by, for example, plasma enhanced chemical vapor deposition (PECVD).

A semiconductor layer 40, which may be made of hydrogenated amorphous silicon, polycrystalline silicon, or n+ hydrogenated amorphous silicon doped with high concentration n-type impurity, and a data conductive layer are consecutively deposited on the gate insulating layer 30 by, for example, sputtering, and then are etched by photolithography to form a data wiring including the semiconductor layer 40, ohmic contact layers 55 and 56, a data line 62, a source electrode 65, and a drain electrode 66.

On the resultant structure, a passivation layer 70 is formed by, for example, reactive CVD, and a contact hole 76 is formed to expose a portion of the drain electrode 66.

A pixel electrode conductive material is formed by, for example, sputtering, and patterned on the passivation layer 70 to form the domain forming unit 83 and the pixel electrode 82 having the domain forming unit 83 formed therein. The pixel electrode 82 may be made of a transparent conductor, such as indium tin oxide (ITO) or indium zinc oxide (IZO). Here, the domain forming unit 83 may an aperture or a protrusion. Although the pixel electrode 82 will be described in detail using an aperture as an example of the domain forming unit 83 in the following description, the present invention is not limited thereto.

The pixel electrode 82 is divided into a plurality of domain regions by the aperture 83, which is a patterned cutout. Here, the aperture 83 includes a transverse portion extending in a transverse direction at an upper half of the pixel electrode 82 and an oblique portion extending in an oblique direction at a lower half of the pixel electrode 82. Here, the two oblique portions located at the upper and lower halves of the pixel electrode 82 are substantially perpendicular to each other to define four fringe fields having different directions. The oblique portions make an angle of about 45 degrees and an angle of about −45 degrees with the gate line 22, respectively, and the aperture 83 may be symmetrical about a line bisecting the pixel electrode 82 into upper and lower halves, the line being parallel to the gate line 22. For example, as shown in FIG. 1, an oblique portion of the aperture 83 making an angle of about 45 degrees with the gate line 22 may be formed at the upper half of the pixel electrode 82, while an oblique portion of the aperture 83 making an angle of about −45 degrees with the gate line 22 may be formed at the lower half of the pixel electrode 82. However, exemplary embodiments of the invention are not limited to the illustrated example, and the shape and arrangement of the oblique portion of the aperture 83 may vary as long as an oblique portion of the aperture 83 forms an angle of about 45 degrees or −45 degrees with the gate line 22.

A display region of the pixel electrode 82 may be divided into a plurality of domain regions by the aperture 83. Liquid crystals 310 included in a liquid crystal mixture 300 are aligned when an electric field is applied. Here, the term "domain" is used to mean a region including liquid crystals 310 that are all aligned in the same direction when an electric field is applied between the pixel electrode 82 and the common electrode 140.

A first vertical alignment layer 92 is formed by printing. The first vertical alignment layer 92 vertically aligns the liquid crystals 310, together with a second vertical alignment layer 152 to be described below. In this stage, a sealant may be printed along the edge of the first display panel 100.

Figure 4:
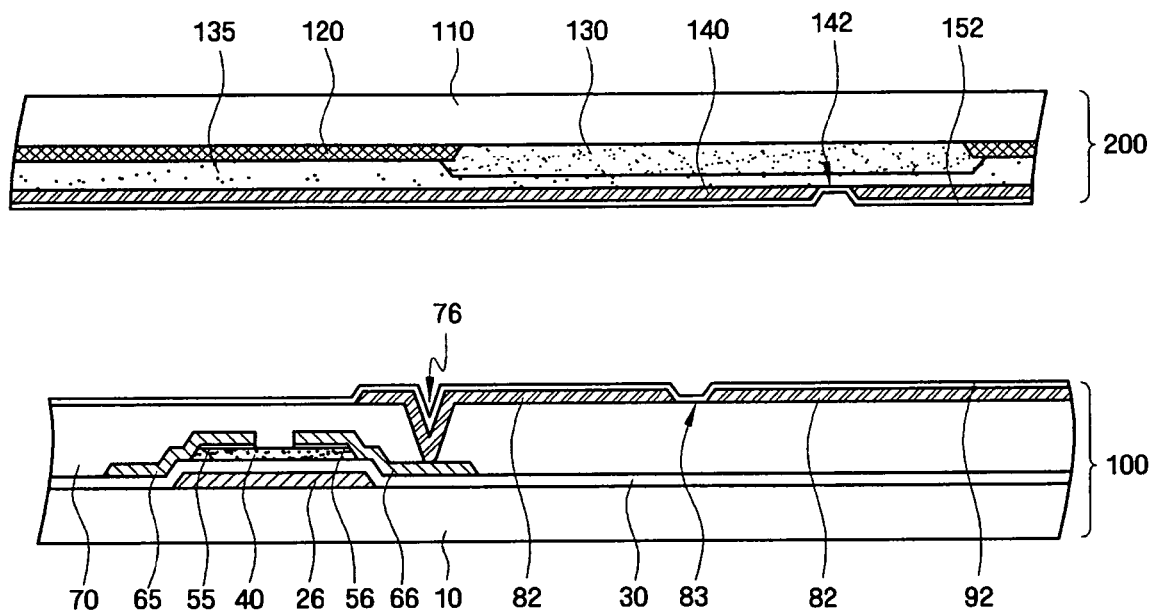

Next, as shown in FIG. 4, a second display panel 200, on which a plurality of elements, such as a common electrode 140 including a second domain forming unit 142 formed therein, are formed, is disposed to face the first display panel 100.

More specifically, an opaque material, such as chrome, is deposited on an insulating substrate 110 and then is patterned to form a black matrix 120 to prevent light leakage and define a pixel region.

A coating material, such as photosensitive resist, is coated on the black matrix 120 and a surface of the insulating substrate 110 that is exposed by the black matrix 120 to form a color filtering layer. The color filtering layer is exposed to light and developed to form a red-green-blue (RGB) color filter 130. An overcoat layer 135 is formed on the black matrix 120 and the color filter 130.

Next, a common electrode conductive material is coated on the overcoat layer 135 to form a common electrode 140.

The second vertical alignment layer 152 is formed on the common electrode 140 by printing. In this stage, a spacer to maintain a distance between the first display panel 100 and the second display panel 200, i.e., a cell gap, may be formed.

The resultant second display panel 200 is disposed to face the first display panel 100 and a sealant is hardened to assemble the first display panel 100 and the second display panel 200 together.

Figure 5:
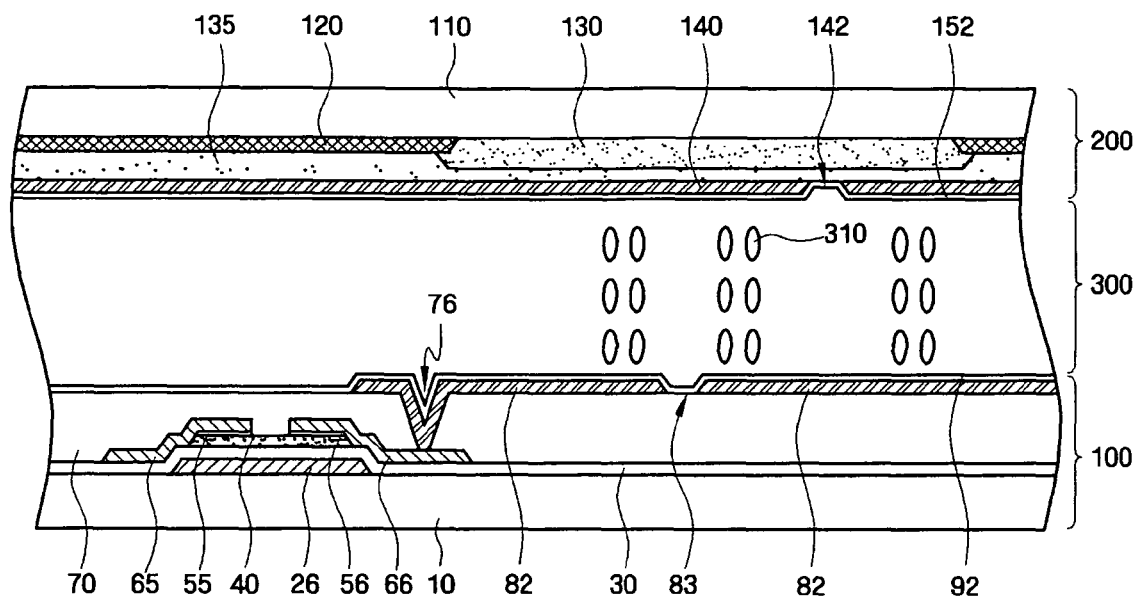

Referring to FIG. 5, the liquid crystals 310 and an alignment additive are disposed between the first display panel 100 and the second display panel 200 by, for example, vacuum injection. Here, the liquid crystals 310 may have negative dielectric anisotropy, and examples thereof include nematic liquid crystals. The alignment additive may include, for example, an ultraviolet (UV) hardening monomer as a reactive monomer. A UV-hardening initiator may be further disposed between the first display panel 100 and the second display panel 200. Examples of the UV hardening monomer may include acrylate monomers, and examples of the UV-hardening initiator may include materials capable of being absorbed into a UV wavelength region, such as 2,2-dimethoxy-1,2-diphenylehanone.

The UV-hardening initiator may be disposed between the first display panel 100 and the second display panel 200 in an amount of greater than 0 weight % and less than or equal to 0.05 weight % based on the total weight of the liquid crystals 310. The UV hardening monomer may be disposed between the first display panel 100 and the second display panel 200 in an amount of greater than 0 weight % and less than or equal to 1 weight % based on the total weight of the liquid crystals 310. In this way, the liquid crystals 310 and the alignment additive are disposed between the first display panel 100 and the second display panel 200 to form the liquid crystal mixture 300.

Figure 6:
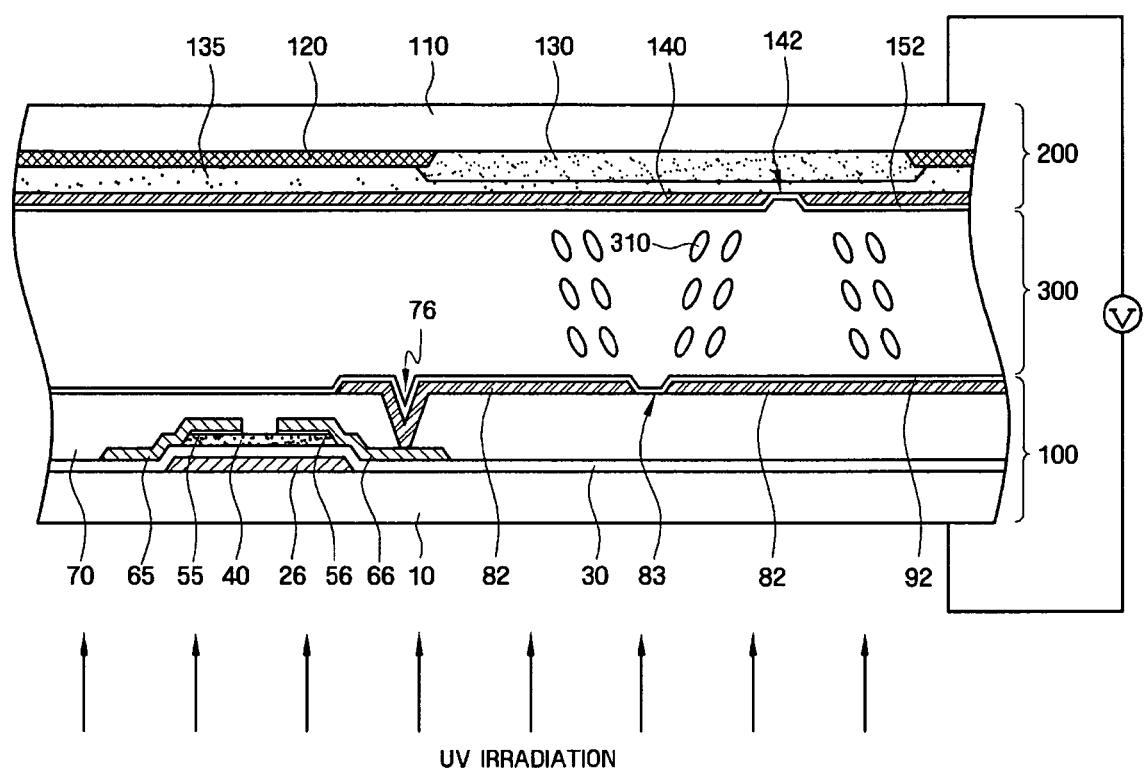
Figure 7:
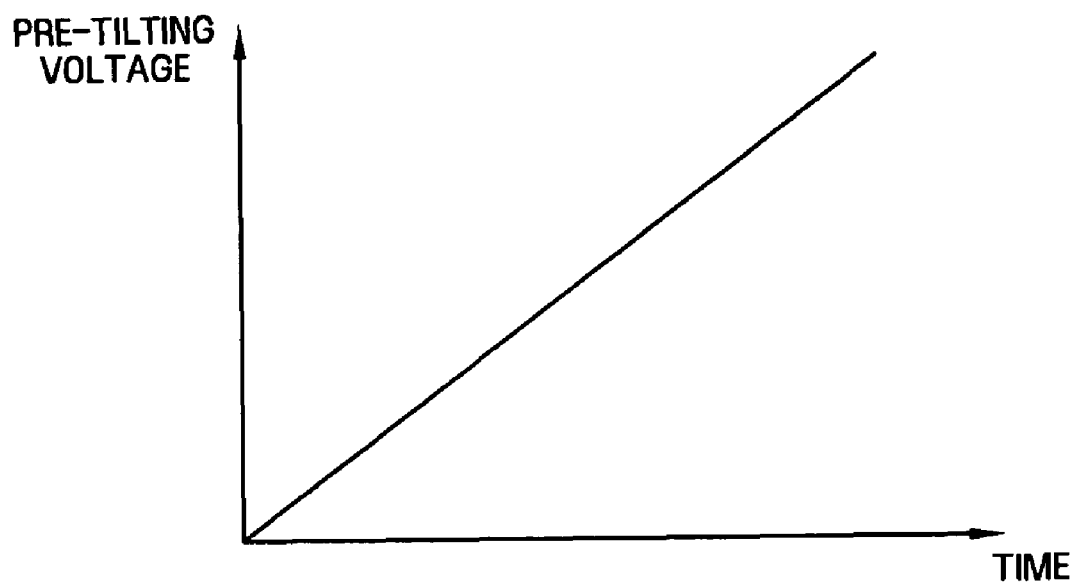
FIG. 7 is a graph of a pre-tilting voltage of FIG. 6.

Referring to FIG. 6, the alignment additive is hardened while a pre-tilting voltage V is applied to the first display panel 100 and the second display panel 200. When the alignment additive is the UV hardening monomer, UV light is irradiated to harden the alignment additive. The pre-tilting voltage V may be applied through a visual testing pad unit of the first display panel 100 and the second display panel 200 or through a separately provided pad unit.

As shown in FIG. 6, a pre-tilting voltage V that gradually increases over time may be applied to the first display panel 100 and the second display panel 200. For example, the voltage level of the pre-tilting voltage V may linearly increase at a constant slope over time, as shown in FIG. 7.

The UV light may be irradiated from below the first display panel 100 towards the first display panel 100. If the UV hardening monomer is not hardened because the color filter 130 absorbs the UV light, a residual image may be generated. In order to minimize the UV absorption of the color filter 130, UV light may be irradiated from below the first display panel 100 towards the first display panel 100. However, in the current exemplary embodiment of the present invention, the UV light may also be irradiated from below the second display panel 200 towards the second display panel 200.

By irradiating with UV light while applying the pre-tilting voltage V, the liquid crystals 310 are pre-tilted, which may improve the response time of the liquid crystal display. When a power supply voltage is not applied to the liquid crystal display, the occurrence of residual images may be reduced when a black screen is displayed in a normally black mode. More specifically, the response time may be improved and the occurrence of residual images may be reduced for the following reasons. When UV light is irradiated, hardening of the UV hardening monomer begins in the area of the UV hardening monomer that is adjacent to the first vertical alignment layer 92 and the second vertical alignment layer 152. Since the liquid crystals 310 are aligned vertically when the pre-tilting voltage V is at a low level, the UV hardening monomer adjacent to the first vertical alignment layer 92 and the second vertical alignment layer 152 may be hardened vertically. As the voltage level of the pre-tilting voltage V gradually increases, the liquid crystals 310 are tilted and thus the UV hardening monomer is also tilted and then hardened. Thus, portions of the UV hardening monomer adjacent to the first vertical alignment layer 92 and the second vertical alignment layer 152 may be hardened vertically and other portions thereof may be gradually tilted and hardened in proportion to distances from the first vertical alignment layer 92 and the second vertical alignment layer 152. Since the liquid crystals 310 are pre-tilted by the domain forming unit 83 and the hardened UV hardening monomer, random motion of the liquid crystals 310 may be prevented when the power supply voltage is applied to the liquid crystal display, which may improve the response time of the liquid crystal display and reduce the occurrence of residual images.

More specifically, for example, if 64 grayscales correspond to 7 V (64-grayscale voltage), 50 grayscales correspond to 4 V (50-grayscale voltage), and 1 grayscale corresponds to 0 V (1-grayscale voltage), the occurrence of residual images may be reduced during display of a black image by irradiating with UV light while sequentially applying the 64-grayscale voltage, the 50-grayscale voltage, and the 1-grayscale voltage. On the other hand, when the level of the pre-tilting voltage V decreases, for example, from the 64-grayscale voltage (7 V) to the 50-grayscale voltage (4 V), and then to the 1-grayscale voltage (0 V), residual images may occur when the black image is displayed.

Figure 8:
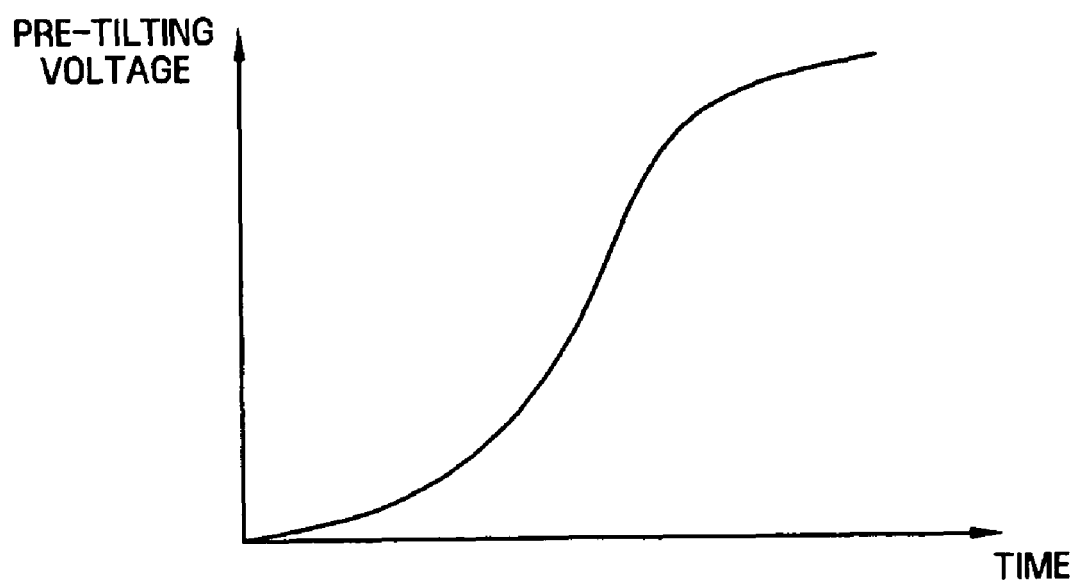
FIG. 8, FIG. 9, and FIG. 10 are graphs of other examples of the pre-tilting voltage.
Figure 9:
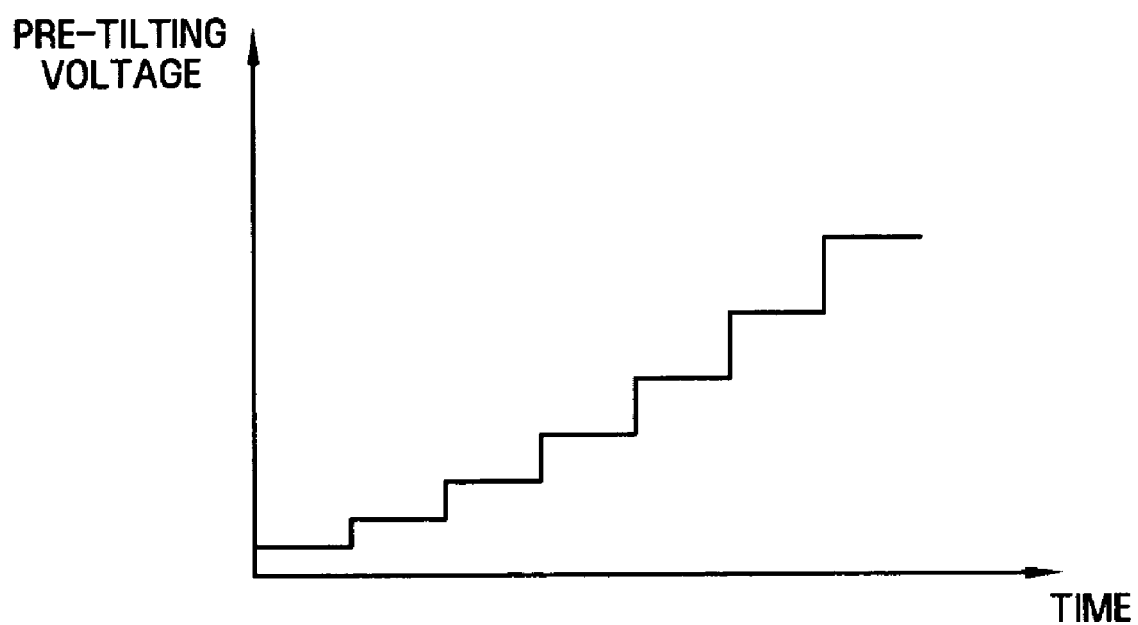
Figure 10:
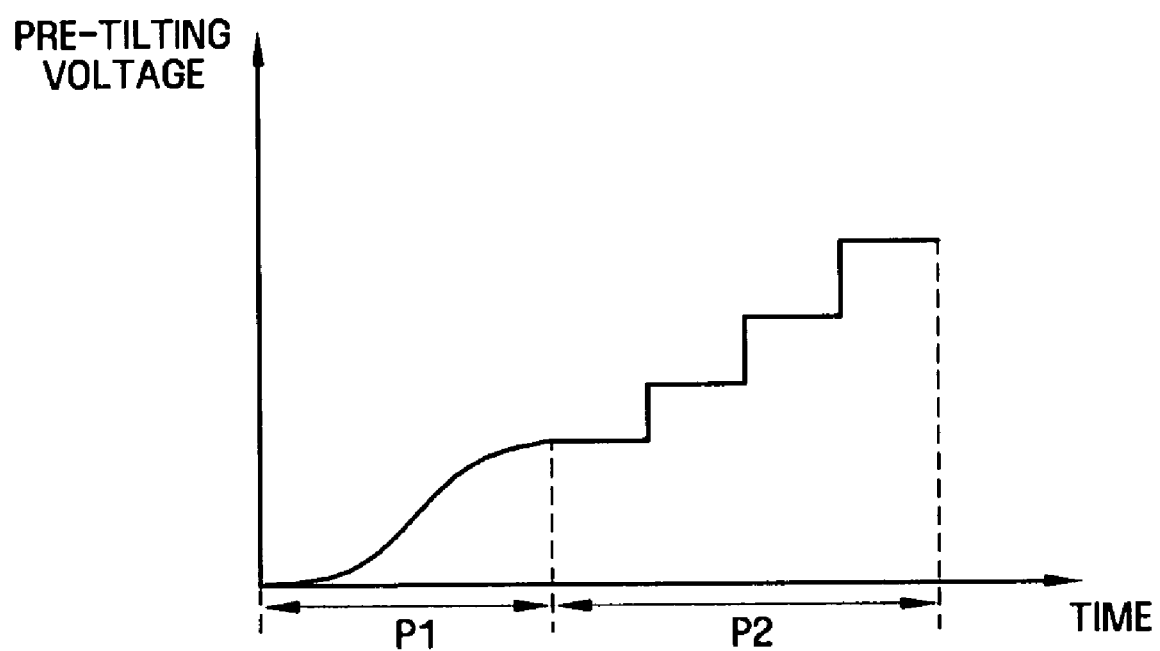

However, the voltage level of the pre-tilting voltage V may also be gradually increased non-linearly. Modified examples of the pre-tilting voltage V will now be described with reference to FIG. 8, FIG. 9, and FIG. 10. FIG. 8, FIG. 9, and FIG. 10 are graphs of the pre-tilting voltage V.

Referring to FIG. 8, the pre-tilting voltage V has a voltage level that increases over time. The voltage level may increase at different rates during different time periods. More specifically, the slope of a tangent line of a curve corresponding to each time period gradually increases and then gradually decreases over time. Unlike in FIG. 8, the slope of the tangent line may gradually decrease and then gradually increase over time. In other words, over all, the voltage level increases over time.

Referring to FIG. 9, the pre-tilting voltage V may have a voltage level that increases stepwise over time. More specifically, each step size may gradually increase over time. Unlike in FIG. 9, each step size may gradually decrease over time.

Referring to FIG. 10, the voltage level of the pre-tilting voltage V may gradually increase over time during a first voltage applying period P1 and stepwise increases over time during a second voltage applying period P2. Unlike in FIG. 10, the voltage level of the pre-tilting voltage V may stepwise increase over time during the first voltage applying period P1 and gradually increase over time at the set slope during the second voltage applying period P2.

In exemplary embodiments of the present invention, the voltage level of the pre-tilting voltage V may increase over time in various ways, without being limited to the examples shown in FIG. 7, FIG. 8, FIG. 9, and FIG. 10.

Referring back to FIG. 6, polarizing plates (not shown) may be disposed on opposite surfaces of the first display panel 100 and the second display panel 200 where a plurality of elements are formed after UV irradiation. The first display panel 100 and the second display panel 200 are provided as unit panels constituting a single liquid crystal display and the liquid crystals 310 are injected between them in the current exemplary embodiment of the present invention for convenience of explanation. However, in a production line requiring mass production, elements such as the pixel electrode 82 may be formed in a first mother substrate (not shown) capable of forming a plurality of first display panels 100 and elements such as the common electrode 140 may be formed in a second mother substrate (not shown) capable of forming a plurality of second display panels 200. Next, the liquid crystals 310 are injected between the first mother substrate and the second mother substrate and UV light is irradiated while the pre-tilting voltage V is applied, thereby forming the liquid crystal mixture 300 having the pre-tilted liquid crystals 310. The first mother substrate and the second mother substrate are cut to form liquid crystal panels that are each composed of a first display panel 100 and a second display panel 200.

A backlight assembly, which may include a lamp, is disposed under the liquid crystal panel, thereby completing the liquid crystal display. However, in the current exemplary embodiment of the present invention, the pixel electrode 82 of the first display panel 100 may be composed of a plurality of micro electrodes to be described below and a plurality of micro slits between the micro electrodes.

Figure 11:
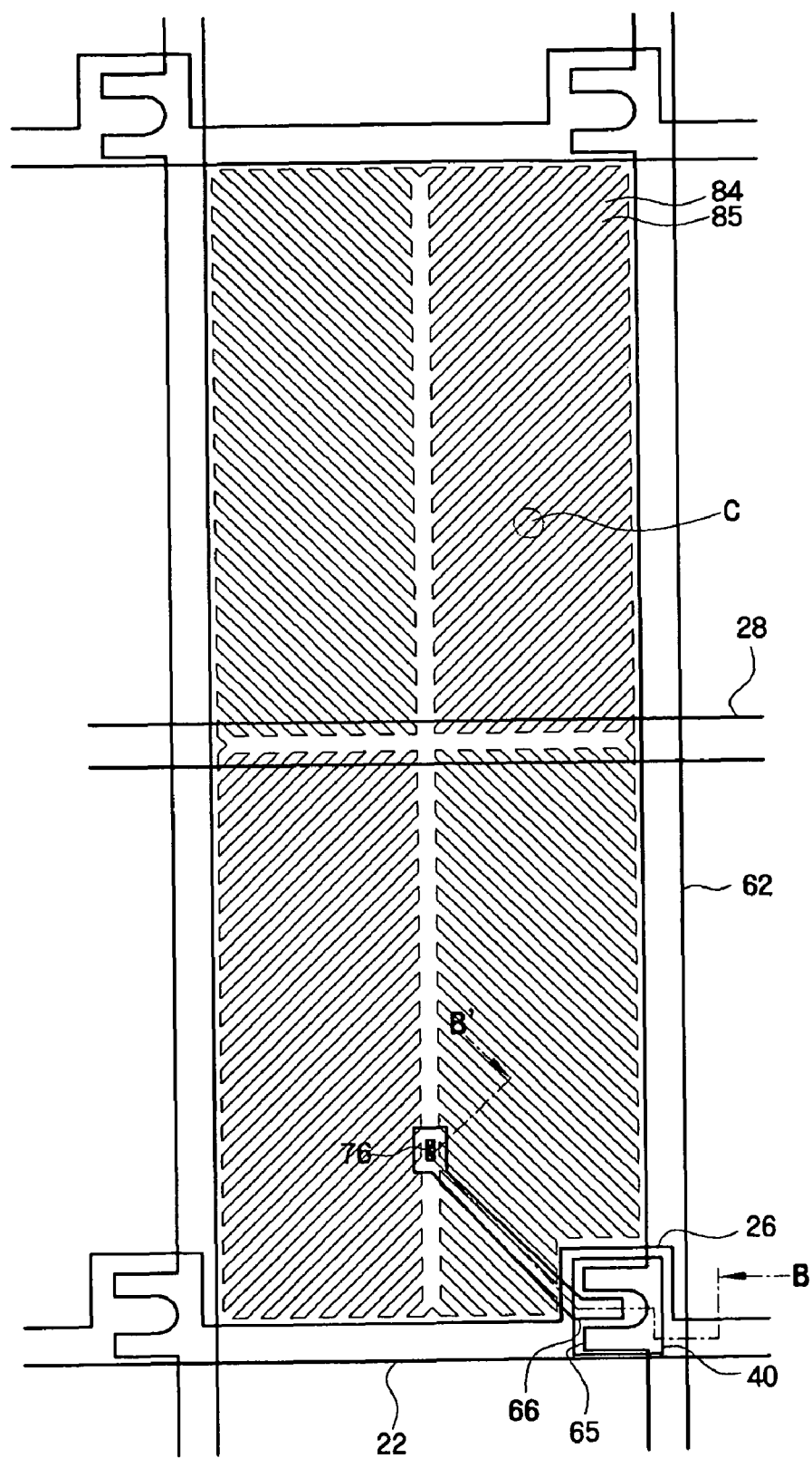
FIG. 11 is a layout diagram of a liquid crystal display manufactured by a method according to another exemplary embodiment of the present invention.

Hereinafter, a method of manufacturing a liquid crystal display according to another exemplary embodiment of the present invention will be described with reference to FIG. 11, FIG. 12, FIG. 13, FIG. 14, FIG. 15, and FIG. 16. FIG. 11 is a layout diagram of a liquid crystal display manufactured by a method according to another exemplary embodiment of the present invention, FIG. 12 is a cross-sectional view taken along line B-B' of FIG. 11, and FIGS. 13 through 16 are cross-sectional views showing processing steps of a method of manufacturing a liquid crystal display according to another embodiment of the present invention.

Figure 12:
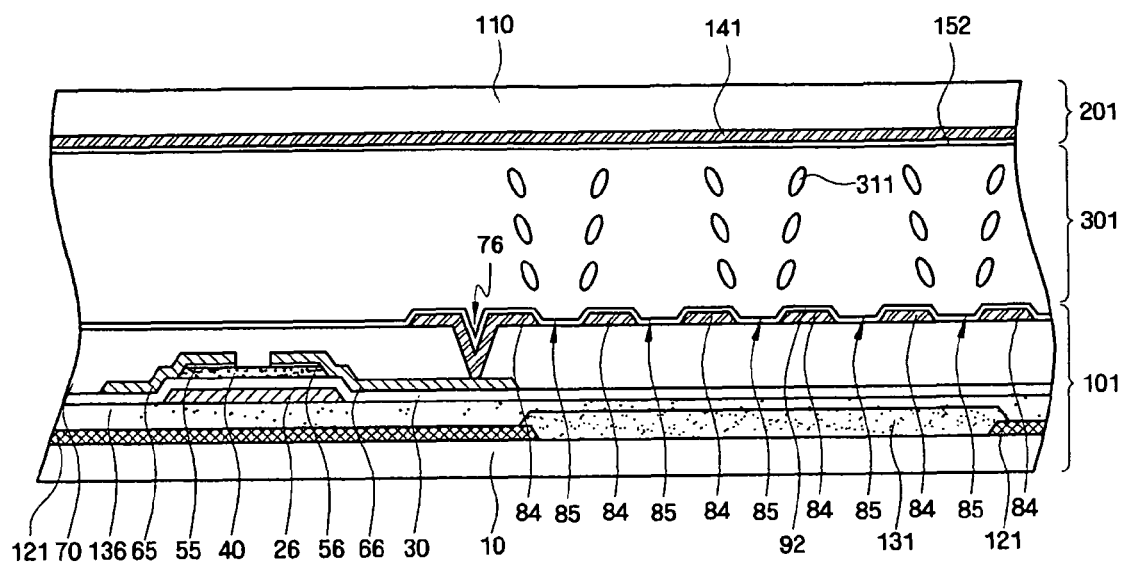
FIG. 12 is a cross-sectional view taken along line B-B' of FIG. 11.
Figure 13:
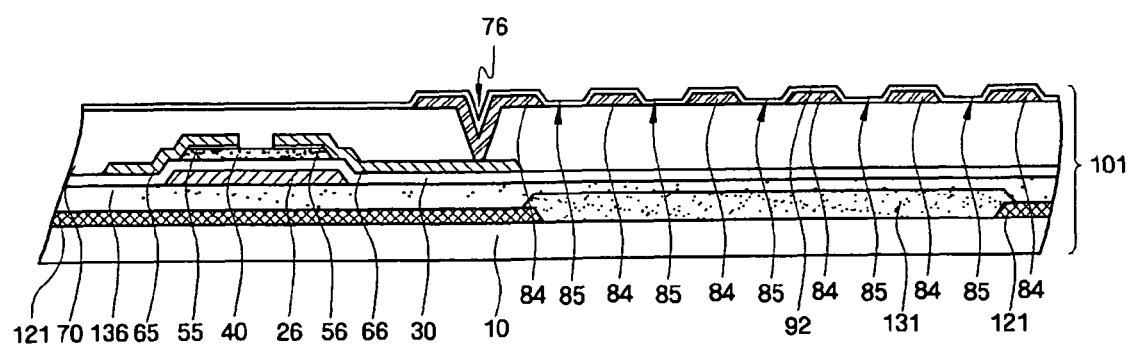
FIG. 13, FIG. 14, FIG. 15, and FIG. 16 are cross-sectional views showing processing steps of a method of manufacturing a liquid crystal display according to another exemplary embodiment of the present invention.

Referring to FIG. 12, unlike in the previous exemplary embodiment of the present invention, in the current exemplary embodiment of the present invention, a color filter 131 and a pixel electrode are formed on a first display panel 101. The manufacturing method according to the current exemplary embodiment of the present invention may be advantageously applied to an array on color filter (AOC) structure in which a thin film transistor array having gate lines is formed on a color filter 131, or a color filter on array (COA) structure in which a color filter 131 is formed on a thin film transistor array. In the following description, the invention will be described in detail with regard to a liquid crystal display having an AOC structure by way of example.

As shown in FIG. 11 and FIG. 12, the first display panel 101 includes a black matrix 121, the color filter 131, a pixel electrode having a plurality of micro electrodes 84 and a plurality of micro slits 85 formed between the micro electrodes 84. However, the pixel electrode may alternatively not include the micro electrodes 84 and the micro slits 85. In other words, the first display panel 101 may include the black matrix 121, the color filter 131, and a pixel electrode shaped as shown in FIG. 1 and FIG. 2. In the following description, it is assumed that the first display panel 101 as shown in FIG. 12 is provided.

More specifically, an opaque material, such as chrome, is deposited on the insulating substrate 10 and then patterned to form the black matrix 121. Photosensitive resist is coated on the black matrix 120 and a surface of the insulating substrate 110, which is exposed by the black matrix 120, and then exposed to light and developed to form an RGB color filter 131. An overcoat layer 136 is formed on the black matrix 121 and the color filter 131.

Using a similar process to that used in the method according to the previous exemplary embodiment of the present invention, a gate wiring including the gate line 22, the gate electrode 26, and the storage electrode 28, the gate insulating layer 30, the semiconductor layer 40, and a data wiring including, the data line 62, the source electrode 65, and the drain electrode 66, are formed on the overcoat layer 136. The passivation layer 70 including the contact hole 76 is formed on the resultant structure.

A pixel electrode conductive layer (not shown) is formed on the passivation layer 70 by, for example, sputtering, and then is patterned to form the pixel electrode having the plurality of micro electrodes 84 and the plurality of micro slits 85 between the micro electrodes 84. A pixel electrode conductive material is patterned to form a cross main frame that quarters a pixel region. The plurality of micro electrodes 84 are formed in slant directions extending from the main frame towards the outline of the pixel region. The plurality of micro slits 85 are between the plurality of micro electrodes 84. In this case, the plurality of micro electrodes 84 are formed in 4 slanting directions from cross main frame, so as to have an angle of about 45° with respect to a transmission axis of a polarizing plate to be described below. The maximum length of the micro electrode 84 should not exceed $(0.5)^{1/2}$ times the width of the pixel electrode based on response time. In other words, the maximum length of the micro electrode 84 should not exceed $(0.5)^{1/2}$ times the width of the cross main frame.

The width of the micro electrode 84 may be constant over the entire pixel region or may vary at a central portion of the pixel electrode, i.e., at a point where the micro electrode 84 contacts the cross main frame and at an outline portion of the pixel region. If the width of the micro electrode 84 is constant over the entire pixel region, the width of the micro electrode 84 and the width of the micro slit 85 may be equal to or different from each other and may be, for example, less than or equal to about 5 μm. The width of the micro electrode 84 near the central portion of the pixel electrode may be larger than that of the micro electrode 84 near the edge of the pixel electrode. In this case, liquid crystals, to be described below, may be easily aligned in the micro slits 85 disposed between the micro electrodes 84.

Like in the previous exemplary embodiment of the present invention, the first vertical alignment layer 92 is formed on the pixel electrode. In this stage, a sealant may be printed along the edge of the first display panel 101.

Figure 14:
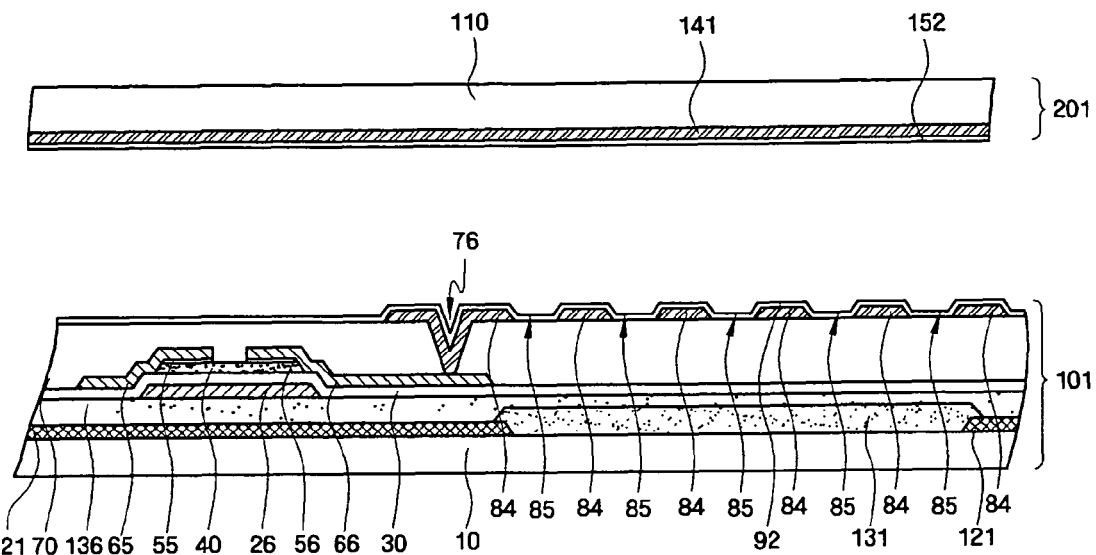

Referring to FIG. 14, a second display panel 201 having a patternless common electrode 141 is provided to face the first display panel 101.

More specifically, a common electrode conductive material composed of, for example, indium tin oxide (ITO) is deposited on the insulating substrate 110 by, for example, sputtering. In the current exemplary embodiment of the present invention, the common electrode 141 is not subject to patterning. For this reason, the deposited common electrode conductive material is used as the common electrode 141. Since the common electrode conductive material in the current exemplary embodiment of the present invention is not patterned, the processing time may be reduced and the failure rate of liquid display panels may also be reduced because misalignment between the first display panel 101 and the second display panel 201 may be prevented.

The second vertical alignment layer 152 is formed on the common electrode 141 by printing. In this stage, a spacer to maintain a distance between the first display panel 101 and the second display panel 201, i.e., a cell gap, may be formed.

The resultant second display panel 201 is disposed to face the first display panel 101 and a sealant is hardened to assemble the first display panel 101 and the second display panel 201 together.

Figure 15:
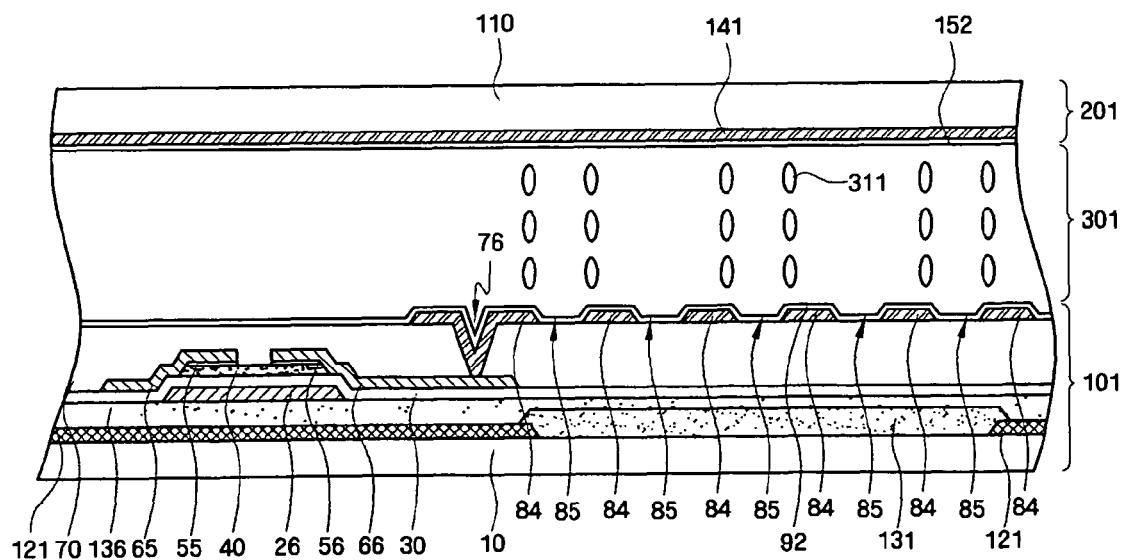

Next, referring to FIG. 15, liquid crystals 311 and an alignment additive are disposed between the first display panel 101 and the second display panel 201 by, for example, vacuum injection. Like in the previous exemplary embodiment of the present invention, the alignment additive may include, for example, a UV hardening monomer. A UV hardening initiator may further be disposed between the first and second display panels 101 and 201. A dopant to adjust the pitch of the liquid crystals 311 may also be disposed between the first and second display panels 101 and 201. Herein, the dopant may be a chiral dopant. The dopant may reduce the pitch of the liquid crystals 311, which may improve the response time of the liquid crystal display. In this way, a liquid crystal mixture 301 is formed by combining the liquid crystals 311 and the alignment additive.

Figure 16:
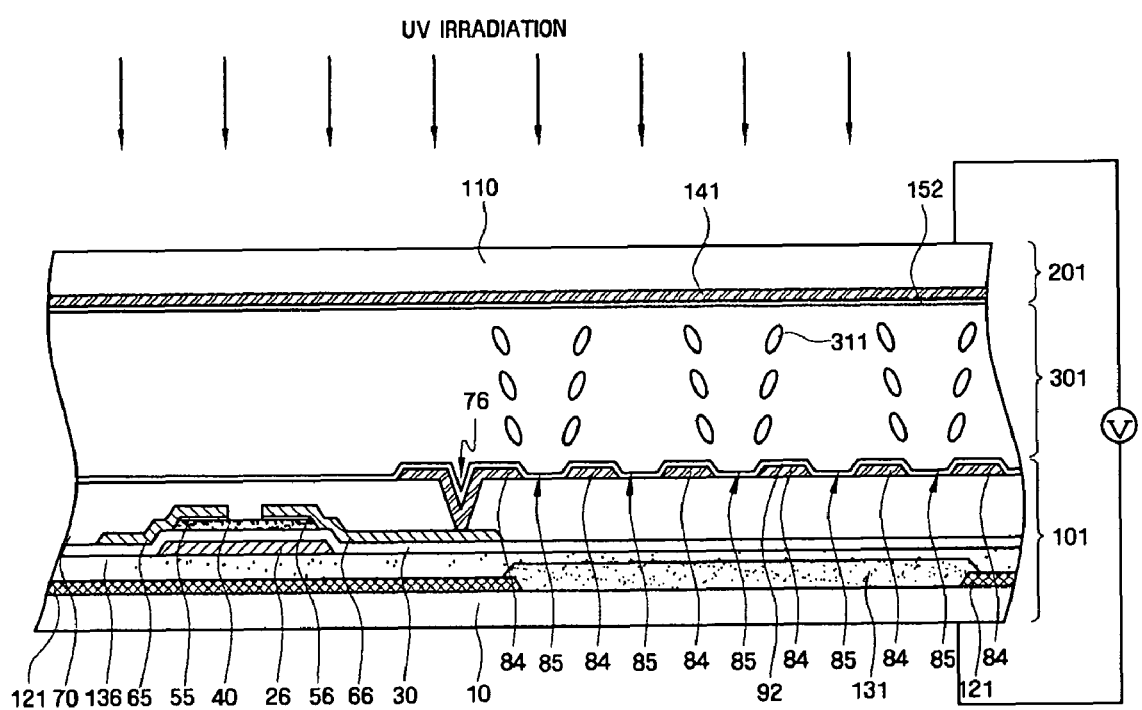

Referring to FIG. 16, a pre-tilting voltage V is applied to the first display panel 101 and the second display panel 201. While the pre-tilting voltage V is being applied, UV light is irradiated to the first display panel 101 and the second display panel 201. Such UV irradiation should be performed immediately after injection of the liquid crystals 311.

The pre-tilting voltage V may increase as shown in FIG. 7, FIG. 8, FIG. 9, and FIG. 10. In other words, the pre-tilting voltage V may have a voltage level which gradually increases over time. The UV light may be irradiated from below the second display panel 201 towards the second display panel 201. If the UV light hardening monomer is not hardened due to the UV absorption of the color filter 131, a residual image may be generated. In order to minimize the UV absorption of the color filter 131, the UV light may be irradiated from below the second display panel 201 towards the second display panel 201. However, in the current exemplary embodiment of the present invention, the UV light may also be irradiated from below the first display panel 101 towards the first display panel 101.

In this way, by irradiating with UV light while applying the pre-tilting voltage V to the liquid crystal display, the UV hardening monomer is hardened to pre-tilt the liquid crystals 311. Since the liquid crystals 311 are pre-tilted by the micro slits 85 and the hardened UV hardening monomer, it may be possible to prevent random motion of the liquid crystals 311 during application of a power supply voltage to the liquid crystal display, and thus to improve a response time required for conversion from black to white in the liquid crystal display and to reduce the occurrence of residual images.

Referring back to FIG. 16, polarizing plates (not shown) may be disposed on opposite surfaces of the first display panel 101 and the second display panel 201 where a plurality of elements are formed after UV irradiation. The first display panel 101 and the second display panel 201 may be formed from respective mother substrates (not shown).

A backlight assembly, which may include a lamp, is disposed under the first display panel 101, thereby completing the liquid crystal display.

However, in the current exemplary embodiment of the present invention, the pixel electrode including the plurality of micro pixels 84 and the plurality of micro slits 85 between the micro pixels 84 may be replaced with the pixel electrode 82 shown in FIG. 1 and FIG. 2 according to the previous exemplary embodiment of the present invention.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method of manufacturing a liquid crystal display, the method comprising:
    disposing liquid crystals and an alignment additive between a first display panel and a second display panel;
    applying an increasing pre-tilting voltage to the first display panel and the second display panel; and
    hardening the alignment additive,
    wherein the pre-tilting voltage gradually increases stepwise during a first voltage applying period.

2. The method of claim 1, wherein the pre-tilting voltage continuously increases during a second voltage applying period.

3. The method of claim 1, wherein the alignment additive comprises an ultraviolet (UV) monomer.

4. The method of claim 3, wherein hardening the alignment additive comprises irradiating UV light onto the alignment additive while applying the pre-tilting voltage.

5. The method of claim 3, wherein the UV monomer is present in an amount greater than 0 weight % and less than or equal to 1 weight % based on the total weight of the liquid crystals.

6. The method of claim 1, wherein the first display panel comprises a first insulating substrate and a color filter, a black matrix, a pixel electrode, and a first alignment layer disposed on the first insulating substrate, and
    wherein the second display panel comprises a second insulating substrate and a common electrode and a second alignment layer disposed on the second insulating substrate.

7. The method of claim 6, wherein the pixel electrode comprises a pixel electrode conductive layer disposed on the first insulating substrate and patterned to form a plurality of micro electrodes and a plurality of micro slits.

8. The method of claim 6, wherein the alignment additive comprises an ultraviolet (UV) monomer, and hardening the alignment additive comprises irradiating UV light onto the alignment additive.

9. The method of claim 1, wherein the first display panel comprises a first insulating substrate and a pixel electrode and a first alignment layer disposed on the first insulating substrate, and
    wherein the second display panel comprises a second insulating substrate and a color filter, a black matrix, a common electrode, and a second alignment layer disposed on the second insulating substrate.

10. The method of claim 9, wherein the pixel electrode comprises a pixel electrode conductive layer disposed on the first insulating substrate and patterned to form a plurality of micro electrodes and a plurality of micro slits.

11. A method of manufacturing a liquid crystal display, the method comprising:
    disposing liquid crystals and a reactive monomer between a first display panel on which a color filter, a black matrix, a pixel electrode, and a first alignment layer are disposed and a second display panel on which a common electrode and a second alignment layer are disposed;
    applying an increasing pre-tilting voltage to the first display panel and the second display panel; and
    irradiating light downward from an upper portion to a lower portion of the second display panel to harden the reactive monomer,
    wherein the pre-tilting voltage gradually increases stepwise during a first voltage applying period.

12. The method of claim 11, wherein the applying of the pre-tilting voltage continuously increases during a second voltage applying period.

13. The method of claim 11, wherein the first display panel comprises a first insulating substrate and a pixel electrode conductive layer disposed on the first insulating substrate and patterned to form a plurality of micro electrodes and a plurality of micro slits.

14. The method of claim 11, wherein the reactive monomer comprises an ultraviolet (UV) monomer, and wherein hardening the reactive monomer comprises irradiating UV light onto the reactive monomer.

15. The method of claim 14, wherein the UV monomer is present in an amount greater than 0 weight % and less than or equal to 1 weight % based on the total weight of the liquid crystals.

16. The method of claim 1, further comprising disposing an UV-hardening initiator between the first display panel and the second display panel, the UV-hardening initiator being present in an amount greater than 0 weight % and less than or equal to 0.05 weight % based on the total weight of the liquid crystals.

* * * * *